(12) United States Patent
Thanos

(10) Patent No.: US 11,528,292 B1
(45) Date of Patent: Dec. 13, 2022

(54) SYSTEMS AND METHODS FOR DEEP PACKET INSPECTION OF VULNERABLE NETWORK DEVICES

(71) Applicant: NortonLifeLock Inc., Tempe, AZ (US)

(72) Inventor: William Thanos, Scotts Valley, CA (US)

(73) Assignee: NortonLifeLock Inc., Tempe, AZ (US)

( * ) Notice: Subject to any disclaimer, the term of this patent is extended or adjusted under 35 U.S.C. 154(b) by 222 days.

(21) Appl. No.: 16/932,167

(22) Filed: Jul. 17, 2020

(51) Int. Cl.
*H04L 9/40* (2022.01)
*H04L 43/028* (2022.01)

(52) U.S. Cl.
CPC ........ *H04L 63/1433* (2013.01); *H04L 43/028* (2013.01); *H04L 63/145* (2013.01); *H04L 63/1416* (2013.01)

(58) Field of Classification Search
CPC ............... H04L 63/1433; H04L 43/028; H04L 63/1416; H04L 63/145
See application file for complete search history.

(56) References Cited

U.S. PATENT DOCUMENTS

| | | | |
|---|---|---|---|
| 7,647,622 B1 | 1/2010 | Sobel et al. | |
| 10,986,109 B2 * | 4/2021 | Howard | H04L 63/0236 |
| 11,038,906 B1 * | 6/2021 | Bingham | H04L 41/12 |
| 11,128,665 B1 * | 9/2021 | Sokolov | H04L 63/1408 |
| 11,165,797 B2 * | 11/2021 | Ackerman | H04L 63/1458 |
| 2004/0078384 A1 * | 4/2004 | Keir | H04L 63/1433 707/999.102 |
| 2012/0331516 A1 * | 12/2012 | Perez Martinez | H04L 63/168 726/1 |
| 2013/0198845 A1 * | 8/2013 | Anvari | H04L 63/1458 726/25 |
| 2016/0127316 A1 * | 5/2016 | Moskow | H04L 63/0263 726/12 |
| 2019/0306708 A1 * | 10/2019 | Judd | H04L 63/0236 |
| 2020/0389469 A1 * | 12/2020 | Litichever | H04L 63/0236 |
| 2021/0021641 A1 * | 1/2021 | Anderson | H04L 63/1416 |
| 2021/0112091 A1 * | 4/2021 | Compton | H04L 63/1416 |
| 2021/0185073 A1 * | 6/2021 | Ewaida | H04L 63/1416 |
| 2021/0194853 A1 * | 6/2021 | Xiao | H04L 63/0281 |
| 2021/0194925 A1 * | 6/2021 | Xiao | H04L 63/0281 |
| 2021/0203521 A1 * | 7/2021 | Konda | H04L 63/1425 |
| 2022/0012340 A1 * | 1/2022 | Rao | H04L 63/20 |
| 2022/0029898 A1 * | 1/2022 | Cociglio | H04L 43/022 |
| 2022/0078208 A1 * | 3/2022 | Anderson | H04L 63/20 |

* cited by examiner

*Primary Examiner* — Joseph P Hirl
*Assistant Examiner* — Stephen T Gundry
(74) *Attorney, Agent, or Firm* — FisherBroyles, LLP

(57) ABSTRACT

The disclosed computer-implemented method for deep packet inspection of vulnerable network devices may include (i) detecting at least one vulnerability associated with a network device service, (ii) identifying one or more network devices associated with the vulnerability, (iii) initiating a deep packet inspection of data traffic communicated by a target network device, (iv) determining, based on the deep packet inspection, one or more signatures associated with a potential malware attack for the target network device, and (v) performing a security action that mitigates the potential malware attack. Various other methods, systems, and computer-readable media are also disclosed.

20 Claims, 7 Drawing Sheets

SYSTEMS AND METHODS FOR DEEP PACKET INSPECTION OF VULNERABLE NETWORK DEVICES

BACKGROUND

Network devices operating in enterprise and consumer computer networks are often at risk of being subjected to a number of targeted attacks by malicious actors that prevent them from effectively carrying out routine operations and/or managing their information assets. For example, malicious actors may exploit a number of vulnerabilities (e.g., open ports, weak device passwords, etc.) associated with services running on network devices such as Internet of Things devices, printers, cameras, etc., to remotely carry out malware attacks. These malware attacks may include, without limitation, ransomware attacks, distributed denial of service (DDoS) attacks, and unauthorized directory access.

Conventional security products utilizing techniques for protection against network device attacks often rely on performing vulnerability scans to examine open device ports and send associated network services information (along with version numbers) to a cloud repository to compare known vulnerabilities. Then, any identified vulnerable devices and services are communicated to users along with any possible remediations (e.g., updating firmware or restricting devices to different networks). However, the aforementioned conventional techniques often fail to achieve their objective of protecting against vulnerabilities due to a number of factors. For example, many users may be unable to perform required software/firmware updates due to technical ability or device manufacturer restrictions. Moreover, these conventional techniques may often utilize traffic scanning services (e.g., an "advanced scanning mode") as an additional security measure where either all of a network's data traffic or only certain high-risk data traffic is inspected, thereby adversely reducing network throughput. Furthermore, the inspection of packets in network data traffic is often limited (e.g., the first 50 packets of a new data flow) leaving open the possibility of an attacker hiding a malicious attack downstream of the inspected packets. Additionally, as conventional inspection techniques often fail to perform packet inspection of low-risk data traffic, certain malicious attacks (e.g., zero-day attacks) may avoid detection.

SUMMARY

As will be described in greater detail below, the present disclosure describes various systems and methods for deep packet inspection of vulnerable network devices.

In one example, a method for deep packet inspection of vulnerable network devices may include (i) detecting, by one or more computing devices, at least one vulnerability associated with a network device service, (ii) identifying, by the one or more computing devices, one or more network devices associated with the vulnerability, (iii) initiating, by the one or more computing devices, a deep packet inspection of data traffic communicated by a target network device, (iv) determining, by the one or more computing devices and based on the deep packet inspection, one or more signatures associated with a potential malware attack for the target network device, and (v) performing, by the one or more computing devices, a security action that mitigates the potential malware attack.

In some embodiments, the vulnerability associated with the network device service may be detected by (i) initiating a scan of each of the network devices to identify at least one open device port and (ii) identifying the vulnerability based on the network device service utilizing the open device port.

In some examples, the deep packet inspection may be initiated by only applying the deep packet inspection on the data traffic communicated by the target network device without impacting other data traffic communicated by any remaining network devices in a network comprising the target network device and the remaining network devices. Additionally or alternatively, the deep packet inspection may be initiated by (i) sending a notification of the vulnerability to a user of the target network device and (ii) receiving a selection of an option to perform the deep packet inspection from the user. Additionally or alternatively, the deep packet inspection may be initiated by applying the deep packet inspection on the data traffic communicated by the target network device when the target network device is one of the identified network devices associated with the vulnerability. Additionally or alternatively, the deep packet inspection may be initiated by applying the deep packet inspection on the data traffic communicated by the target network device when the target network device is not one of the identified network devices associated with the vulnerability.

In some embodiments, the signatures associated with the potential malware attack may be determined by (i) initiating a device scan to identify a packet signature for the data traffic communicated by the target network device, (ii) comparing the packet signature to a set of known malware signatures in a database, and (iii) determining a signature is associated with the potential malware attack based on a match between the packet signature and at least one of the set of known malware signatures.

In some examples, the security action may include generating a notification of the potential malware attack to a user of the target network device based on the deep packet inspection. In some embodiments, the vulnerability may include a remote access capability that utilizes the network device service to send potentially malicious code over an open port on the target network device. Additionally or alternatively, the vulnerability may include a remote access capability that utilizes the network device service to access private user data over an open port on the target network device.

In one embodiment, a system for deep packet inspection of vulnerable network devices may include at least one physical processor and physical memory that includes a set of modules and computer-executable instructions that, when executed by the physical processor, cause the physical processor to (i) detect, by a detection module, at least one vulnerability associated with a network device service, (ii) identify, by an identification module, one or more network devices associated with the vulnerability, (iii) initiate, by an inspection module, a deep packet inspection of data traffic communicated by a target network device, (iv) determine, by a determining module and based on the deep packet inspection, one or more signatures associated with a potential malware attack for the target network device, and (v) perform, by a security module, a security action that mitigates the potential malware attack.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect at least one vulnerability associated with a network device service, (ii) identify one or more network devices associated with the vulnerability, (iii) initiate a deep packet inspection of data traffic communicated by a target network device, (iv) determine, based on the deep packet inspection, one or more signatures associated with a potential malware attack for the target network device, and (v) perform a security action that mitigates the potential malware attack.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
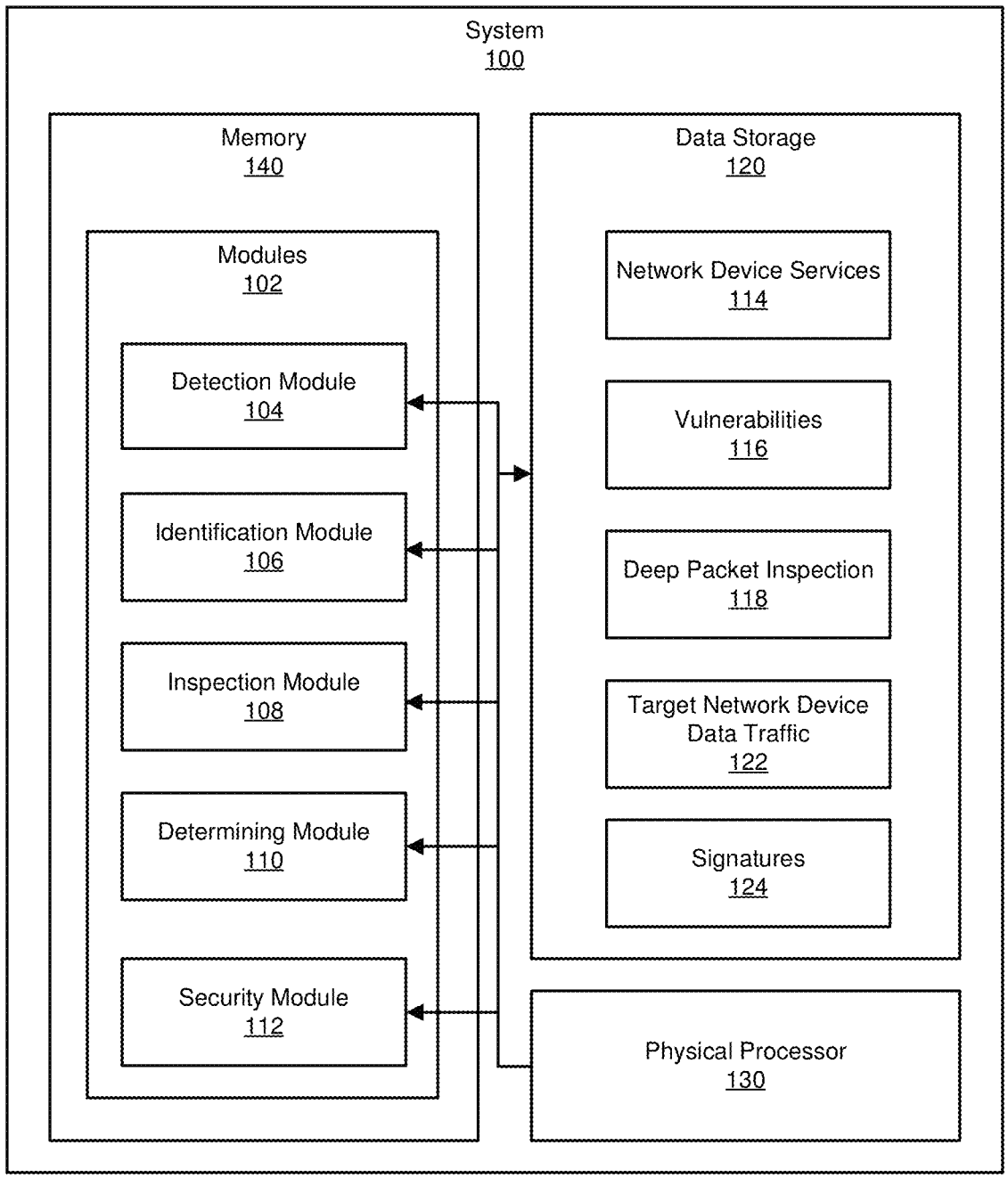
FIG. 1 is a block diagram of an example system for deep packet inspection of vulnerable network devices.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for deep packet inspection of vulnerable network devices. As will be explained in greater detail below, by identifying specific vulnerabilities for a network device and then applying data packet inspection only on data traffic communicated by the identified network device (instead of inspecting all of a network's traffic), and thereby reducing network throughput degradation typically associated with network traffic scanning techniques employed by conventional security solutions. In addition, the systems and methods described herein may improve the functioning of a computing device by reducing the computing device's susceptibility to malicious (e.g., malware) attacks by employing advanced data packet inspection techniques such as always scanning network traffic communicated by the computing device regardless of the reputation of a website connected to the computing device.

Figure 2:
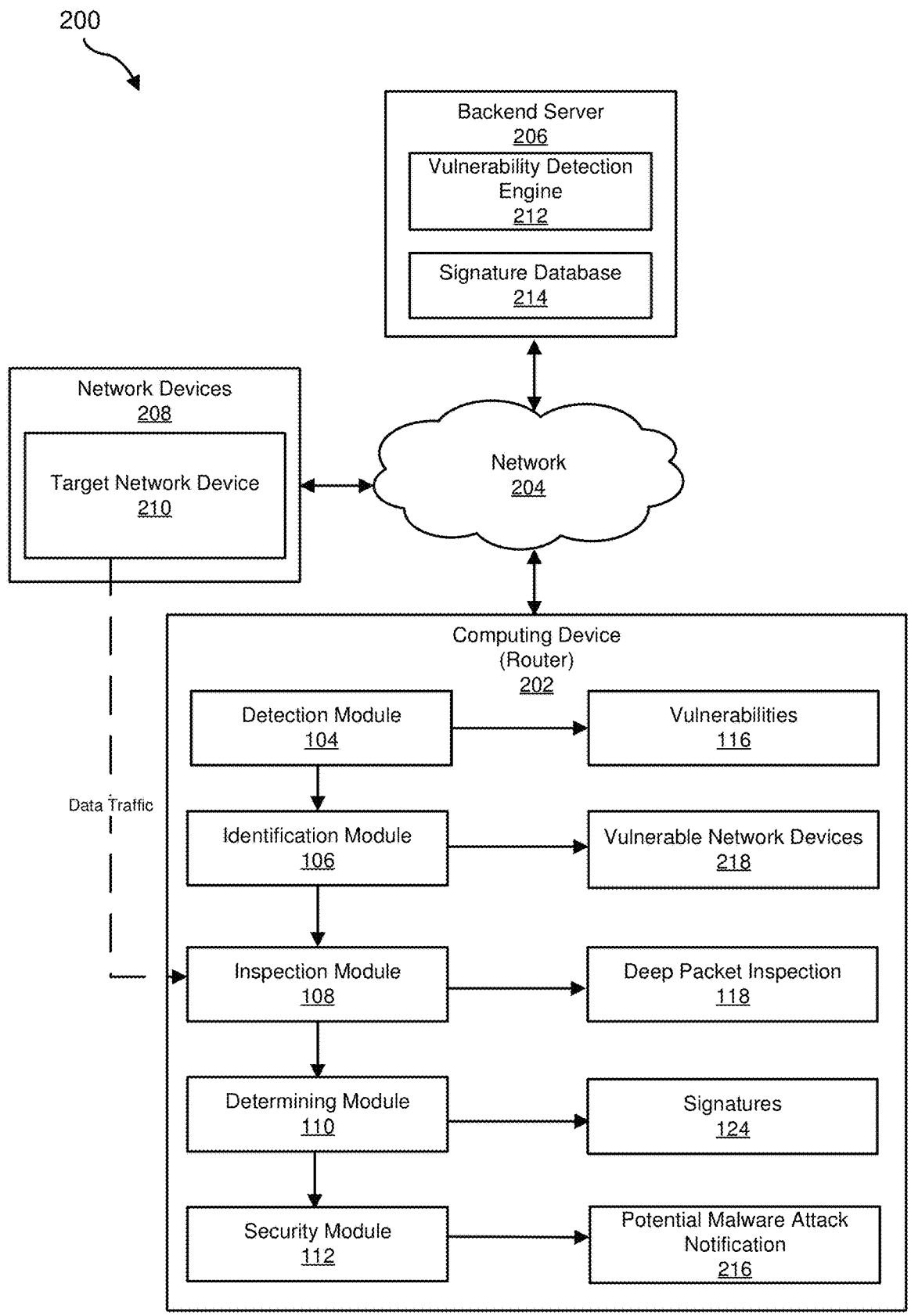
FIG. 2 is a block diagram of an additional example system for deep packet inspection of vulnerable network devices.

The following will provide, with reference to FIGS. 1-2, detailed descriptions of example systems for deep packet inspection of vulnerable network devices. Detailed descriptions of corresponding computer-implemented methods will also be provided in connection with FIGS. 3-4. A detailed description of example user interfaces generated by an example system for deep packet inspection of vulnerable network devices will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for deep packet inspection of vulnerable network devices. As illustrated in this figure, example system 100 may include one or more modules 102 for performing one or more tasks. For example, and as will be explained in greater detail below, example system 100 may include a detection module 104 that detects vulnerabilities 116 associated with one or more network device services 114. Example system 100 may additionally include an identification module 106 that identifies one or more network devices associated with vulnerabilities 116. Example system 100 may also include an inspection module 108 that initiates a deep packet inspection 118 of data traffic (i.e., target network device data traffic 122) communicated by a target network device. Example system 100 may additionally include a determining module 110 that determines, based on deep packet inspection 118, one or more signatures 124 associated with a potential malware attack for the target network device. Example system 100 may also include a security module 112 that performs a security action that mitigates the potential malware attack. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, backend server 206, and/or network devices 208). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate deep packet inspection of vulnerable network devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store network device services 114, vulnerabilities 116, deep packet inspection 118, target network device traffic 122, and signatures 124.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with backend server 206 and network devices 208 (which may include target network device 210) via a network 204. In one example, all or a portion of the functionality of modules 102 may be performed by computing device 202, backend server 206, network devices 208, and/or any other suitable computing system. As will be described in greater detail below, one or more of modules 102 from FIG. 1 may, when executed by at least one processor of computing device 202, enable computing device 202 to perform deep packet inspection of vulnerable network devices.

For example, detection module 104 (in conjunction with vulnerability detection engine 212) may detect vulnerabilities 116 associated with network devices 208. Next, identification module 106 may identify vulnerable network devices 218. Then, inspection module 108 may initiate deep packet inspection 118 of data traffic communicated by target network device 210. Next, determining module 110 may determine, based on deep packet inspection 118 (and utilizing signature database 214), signatures 124 associated with a potential malware attack for target network device 210. Next, security module 112 may generate potential malware attack notification 216 for use in mitigating the potential malware attack for target network device 210.

Computing device 202 generally represents any type or form of computing device capable of reading computer-executable instructions. In some examples, computing device 202 may be one or more network routers for providing various network device services 114 to network devices 208. Additional examples of computing device 202 (which may also serve as examples of network devices 208 and target network device 210) include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Backend server 206 generally represents any type or form of computing device that is capable of reading computer-executable instructions. For example, backend server 206 may be a security server configured to perform various security tasks for a network such as vulnerability and malware detection. Additional examples of backend server 206 include, without limitation, application servers, web servers, storage servers, and/or database servers configured to run certain software applications and/or provide various security, web, storage, and/or database services. Although illustrated as a single entity in FIG. 2, backend server 206 may include and/or represent a plurality of servers that work and/or operate in conjunction with one another.

Network 204 generally represents any medium or architecture capable of facilitating communication or data transfer. In one example, network 204 may facilitate communication between computing device 202, network devices 208 (including target network device 210) and backend server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
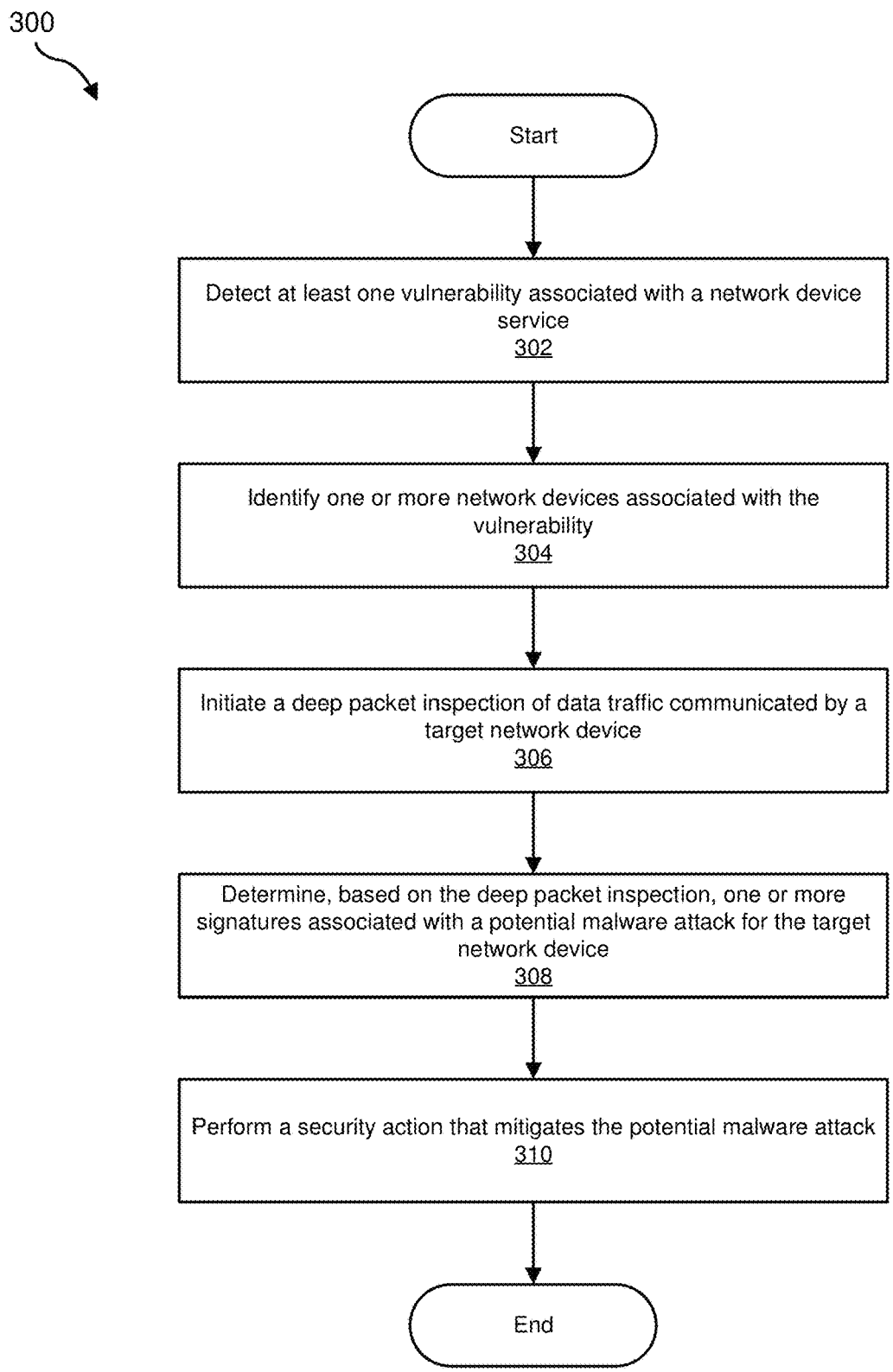
FIG. 3 is a flow diagram of an example method for deep packet inspection of vulnerable network devices.

FIG. 3 is a flow diagram of an example computer-implemented method 300 for deep packet inspection of vulnerable network devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may detect at least one vulnerability associated with a network device service. For example, detection module 104 may, as part of computing device 202 in FIG. 2, detect vulnerabilities 116 associated with network device service 114.

The term "vulnerability," as used herein, generally refers to any weakness in a computing network that may be exploited by a malicious entity (i.e., an attacker) for performing unauthorized actions within a computing system. For example, a vulnerability may include an open computing device port that may be utilized by an attacker to send potentially malicious code (e.g., for executing ransomware attacks, denial of service (e.g., DDoS) attacks, credential brute force attacks, injecting potentially damaging arbitrary code, etc.) over a network to a target network computing device or to access private user data (e.g., directory contents, files, etc.). Other vulnerabilities may include network computing devices protected by a weak password (e.g., a default network router password such as "password").

The term "network device service," as used herein, generally refers to any application running on a computing device in a network that provides data storage, manipulation, presentation, communication, or other capability which is implemented using a client-server or peer-to-peer architecture based on application layer network protocols (e.g., TCP/IP). Examples of network device services may include, without limitation, data storage (e.g., provided by network-attached storage (NAS) devices), Voice over Internet Protocol (VoIP), network access (e.g., provided by routers and gateways), media (e.g., provided by digital media players), Internet of things (IoT) device services, etc.

Detection module 104 may detect vulnerabilities 116 in a variety of ways. In some embodiments, detection module 104 may initiate a scan of network devices 208 to identify at least one open device port (e.g., an open file transfer port (FTP) or hypertext protocol port (HTTP)) and then identify a vulnerability 116 based on a network device service 114 (e.g., file transfers or website requests) utilizing the open port. For example, detection module 104 may scan device ports on each of network devices 208 and then send data associated with the device ports (e.g., network device service 114 data and version number data) to vulnerability detection engine 212 on backend server 206.

At step 304, one or more of the systems described herein may identify one or more network devices associated with the vulnerability. For example, identification module 106 may, as part of computing device 202 in FIG. 2, identify target network device 210 as having a vulnerability 116.

Identification module 106 may identify target network device 210 in a variety of ways. In some embodiments, identification module 106 may identify a network device 208 having an open device port, and which detection module 104 has determined is associated with a vulnerable network device service 114, as the target network device 210. In this example, the target network device 210 may be designated as a vulnerable network device 218. Additionally or alternatively, identification module may identify other network devices 208 having vulnerabilities 116 as vulnerable network devices 218. In this example, target network device 210 may or may not be included in vulnerable network devices 218. For example, and as will be described in greater detail herein, in one embodiment, deep packet inspection may be performed on any network device regardless of whether the network device has been identified as a vulnerable (i.e., regardless of whether a network device port scan of the device has found any vulnerable services).

At step 306, one or more of the systems described herein may initiate a deep packet inspection of data traffic communicated by a target network device. For example, inspection module 108 may, as part of computing device 202 in FIG. 2, initiate deep packet inspection 118 of data traffic communicated by target network device 210.

The term "deep packet inspection," as used herein, generally refers to any type of data processing utilized for inspecting data communicated over a computer network. For example, in a computing network, deep packet inspection may be utilized to check data packets communicated by a network device for signatures corresponding to malicious code (e.g., malware).

Inspection module 108 may initiate deep packet inspection 118 in a variety of ways. In some embodiments, inspection module 108 may only apply deep packet inspection 118 on target network device data traffic 122 without impacting other data traffic communicated by remaining network devices 208. Additionally or alternatively, inspection module 108 may send a notification of one or more vulnerabilities 116 that are associated with target network device 210 to a user and then receive a selection of an option from the user to perform deep packet inspection 118. Additionally or alternatively, inspection module 108 may apply deep packet inspection 118 on target network device data traffic 122 when target network device 210 has been identified as having a vulnerability 116. Additionally or alternatively, inspection module 108 may apply deep packet inspection 118 target network device data traffic 122 when target network device 210 has not been identified as one of vulnerable network devices 218. In this example, a user of target network device 210 may elect to perform deep packet inspection 118 whenever he or she has a specific concern even if an open port device scan of target network device 210 has not identified a vulnerability 116.

At step 308, one or more of the systems described herein may determine, based on the deep packet inspection initiated at step 306, one or more signatures associated with a potential malware attack for the target network device. For example, determining module 110 may, as part of computing device 202 in FIG. 2, determine one or more signatures 124 associated with a potential malware attack for target network device 210. In some examples, signatures 124 may include patterns in network data traffic that correspond to known malicious activity (such as malware) or that contain anomalous data representing unknown and potentially malicious activity.

Determining module 110 may determine signatures 124 in a variety of ways. For example, and turning now to FIG. 4, a flow diagram of an example computer-implemented method 400 for determining signatures associated with a potential network device malware attack is shown. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

Figure 4:
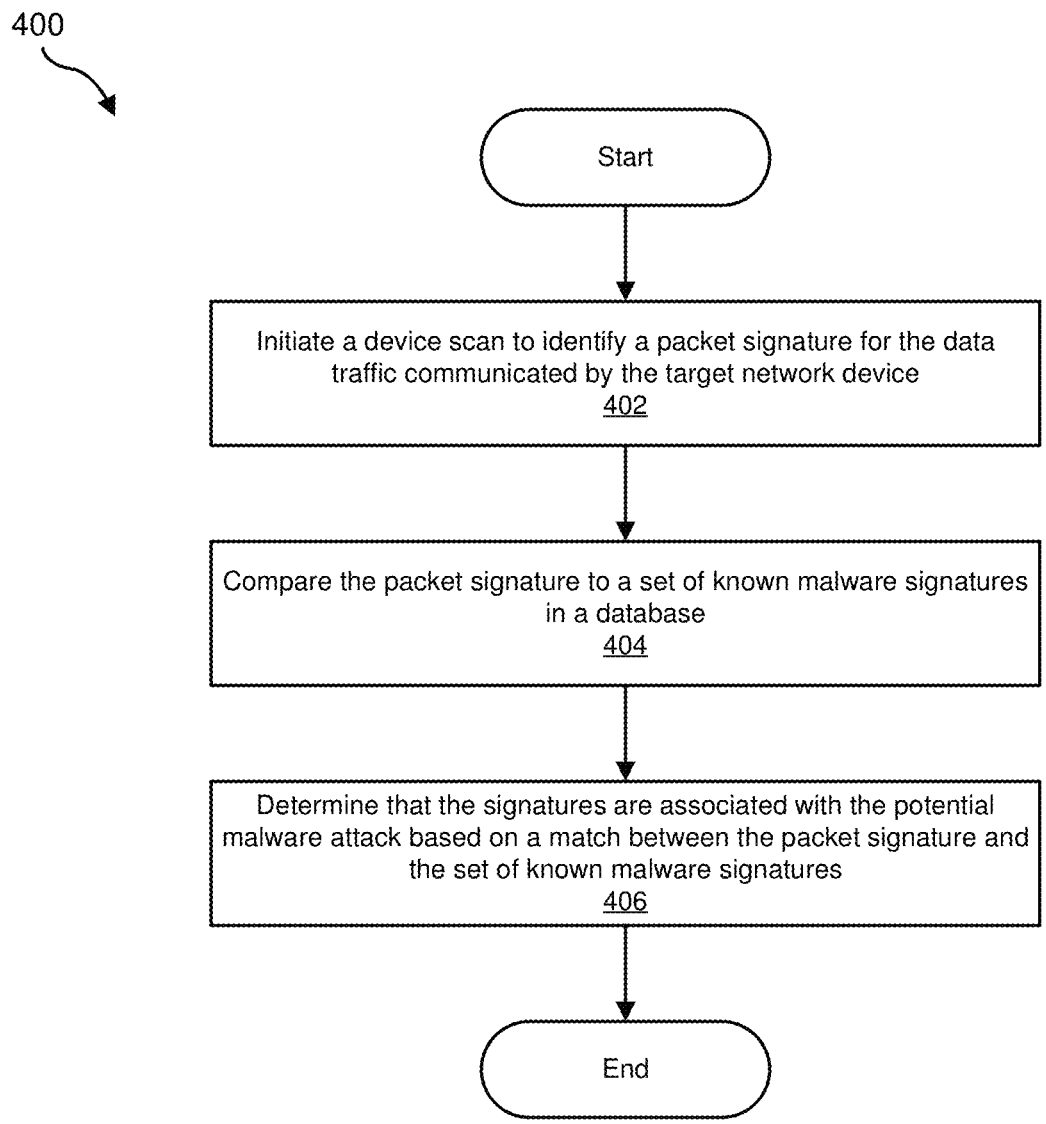
FIG. 4 is a flow diagram of an example method for determining signatures associated with a potential network device malware attack.

As illustrated in FIG. 4, at step 402 one or more of the systems described herein may Initiate a device scan to identify a packet signature for the data traffic communicated by the target network device. For example, detection module 110 may, as part of computing device 202 in FIG. 2, initiate a device scan to identify a packet signature (i.e., a signature 124) for target network device traffic 122.

Detection module 110 may initiate the device scan in a variety of ways. In some examples, detection module 110 may be configured to initiate a scan of target network device traffic 122 for a signature 124 upon a user being notified that target network device 210 has a vulnerability 116 and after selecting an "enhanced inspection mode" in a user interface associated with performing deep packet inspection 118 on target network device 210.

At step 404, one or more of the systems described herein may compare the packet signature to a set of known malware signatures in a database. For example, determining module 110 may, as part of computing device 202 in FIG. 2, compare a packet signature for target network device data traffic 122 to a set of known malware signatures.

Determining module 110 may compare the packet signature to the malware signatures in a variety of ways. In some embodiments, determining module 110 may compare the packet signature for target network device data traffic 122 to known malware signatures in signature database 214 on backend server 206.

At step 406, one or more of the systems described herein may determine that the signatures are associated with the potential malware attack based on a match between the packet signature and the set of known malware signatures. For example, determining module 110 may, as part of computing device 202 in FIG. 2, determine that a signature 124 for target network device data traffic 122 is associated with a potential malware attack based on a match between the packet signature and the set of known malware signatures in signature database 214 on backend server 206.

Determining module 110 may determine that a signature 124 is associated with a potential malware attack in a variety of ways. In some embodiments, determining module 110 may determine if a signature 124 matches any malware or attack signatures capable of impacting performance of target network device 210.

Returning now to FIG. 3, at step 310, one or more of the systems described herein may perform a security action that mitigates the potential malware attack determined based on the deep packet inspection. For example, security module 112 may, as part of computing device 202 in FIG. 2, perform a security action that mitigates a potential malware attack determined for target network device 210, based on deep packet inspection 118. In some examples, a potential malware attack may correspond to a signature 124 for target network device data traffic 122 matches a known malware or attack signature in signature database 214 on backend server 206.

Security module 112 may perform a security action that mitigates a potential malware attack in a variety of ways. In some examples, security module 112 may generate potential malware attack notification 216 to a user of target network device 210. In some examples, potential malware attack notification 216 may be generated for display in a user interface in a mobile application for allowing a user to initiate scans for vulnerable network devices 218 and further initiate deep packet inspection 118 following the selection of an "enhanced inspection mode." In some examples, potential malware attack notification 216 may include one or more mitigation options such as removing ransomware, blocking attacks by known malware, enhancing network device security to remove vulnerabilities 116, etc.

Figure 5:
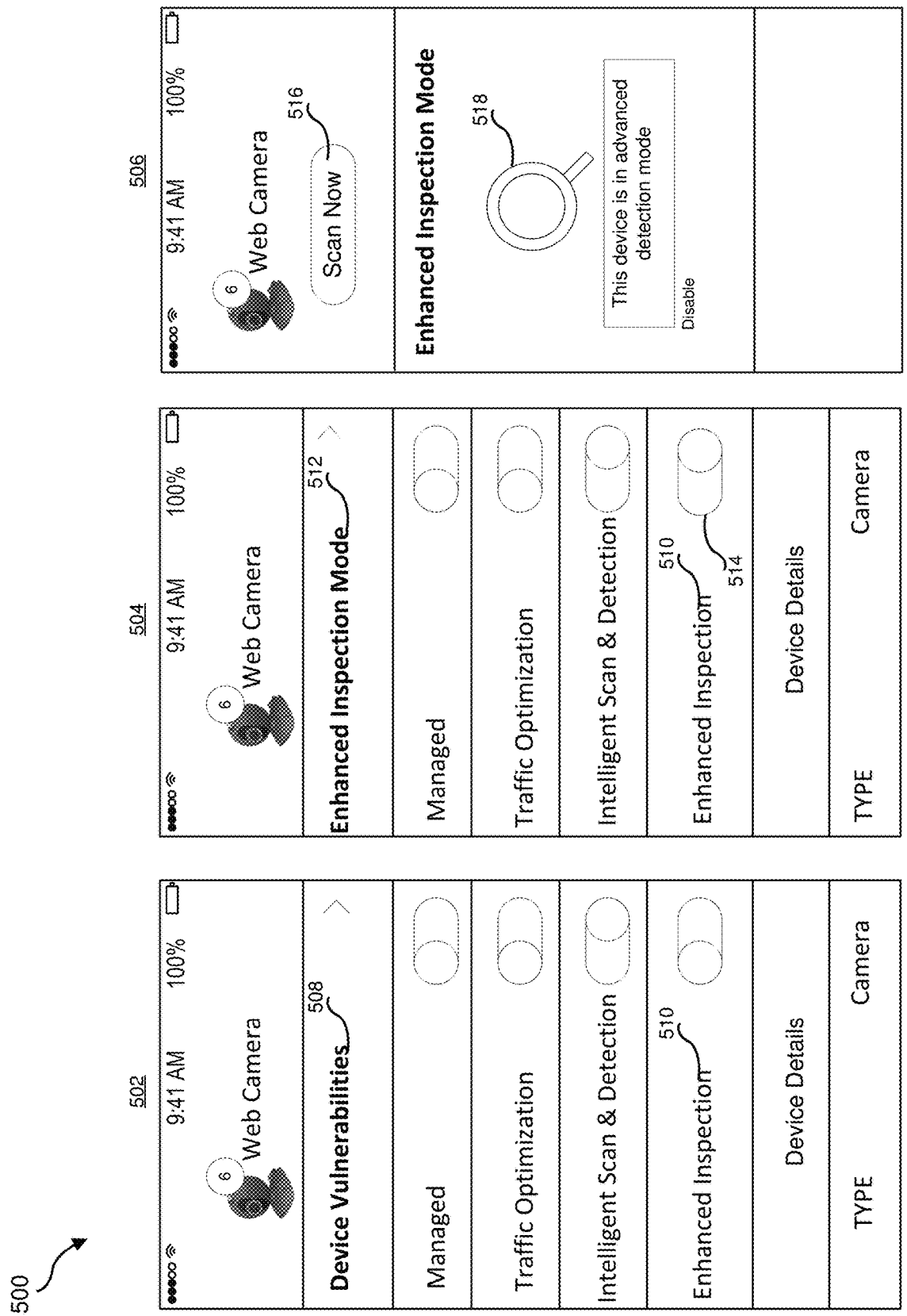
FIG. 5 is a block diagram of example user interfaces generated by an example system for deep packet inspection of vulnerable network devices.

FIG. 5 is a block diagram of example user interfaces generated by an example system for deep packet inspection of vulnerable network devices (e.g., a web camera). The example user interfaces of FIG. 5 may include user interfaces 502, 504, and 506. User interface 502 shows the results of a completed network device scan in which one or more device vulnerabilities 508 have been identified. User interface 502 also shows an enhanced inspection option 510 including a user selectable control for initiating deep packet inspection on network devices associated with device vulnerabilities 508.

User interface 504 shows a user control 514 for enhanced inspection option 510 having been selected by a user and for entering into enhanced inspection mode 512 for initiating deep packet inspection on network devices associated with device vulnerabilities 508. For example, a user of a web camera having one or more detected device vulnerabilities 508 may choose to initiate a deep packet inspection by selecting enhanced inspection option 510 (via user control 514) to enter into enhanced inspection mode 512.

User interface 506 shows a selectable user option 516 (i.e., "Scan Now") for initiating a deep packet inspection for a vulnerable network device as part of enhanced inspection mode 512. User interface 506 also shows an inspection icon 518 which may be displayed once the deep packet inspection for a vulnerable network device has been initiated (i.e., after a user has selected the "Scan Now" user option 516.

As explained above in connection with example method 300 in FIG. 3, the disclosed systems described herein may be utilized to detect specific vulnerabilities for a network device and then apply advanced deep packet inspection (DPI) techniques on the detected network device for providing additional security without impacting any remaining traffic in a network. The advanced DPI techniques may include a scan of network data traffic only on vulnerable network devices (i.e., network devices known to have a vulnerable port) and only in response to an end user enabling a "vulnerable device specific DPI mode" from within a computing device application. The computing device application, in accordance with the disclosed systems described herein, may further be utilized to provide a visual indication (e.g., a checkmark) that an added layer of protection has been added thereby giving a user the ability to take action to reduce a risk of exploitation for a vulnerable network device. The disclosed systems described herein may further remove disadvantages associated with scanning all network traffic (such as degraded throughput) during advanced DPI inspection. The disclosed systems described herein may further provide, within the computing application, an option for weak password detection (e.g., providing a checkmark that a password has been replaced with a more secure one as a form of vulnerability remediation). The disclosed systems described herein may additionally enable a user to select any network device on a network and target the advanced DPI inspection for the selected network device, regardless of whether or not a previous port scan identified a vulnerable service.

Figure 6:
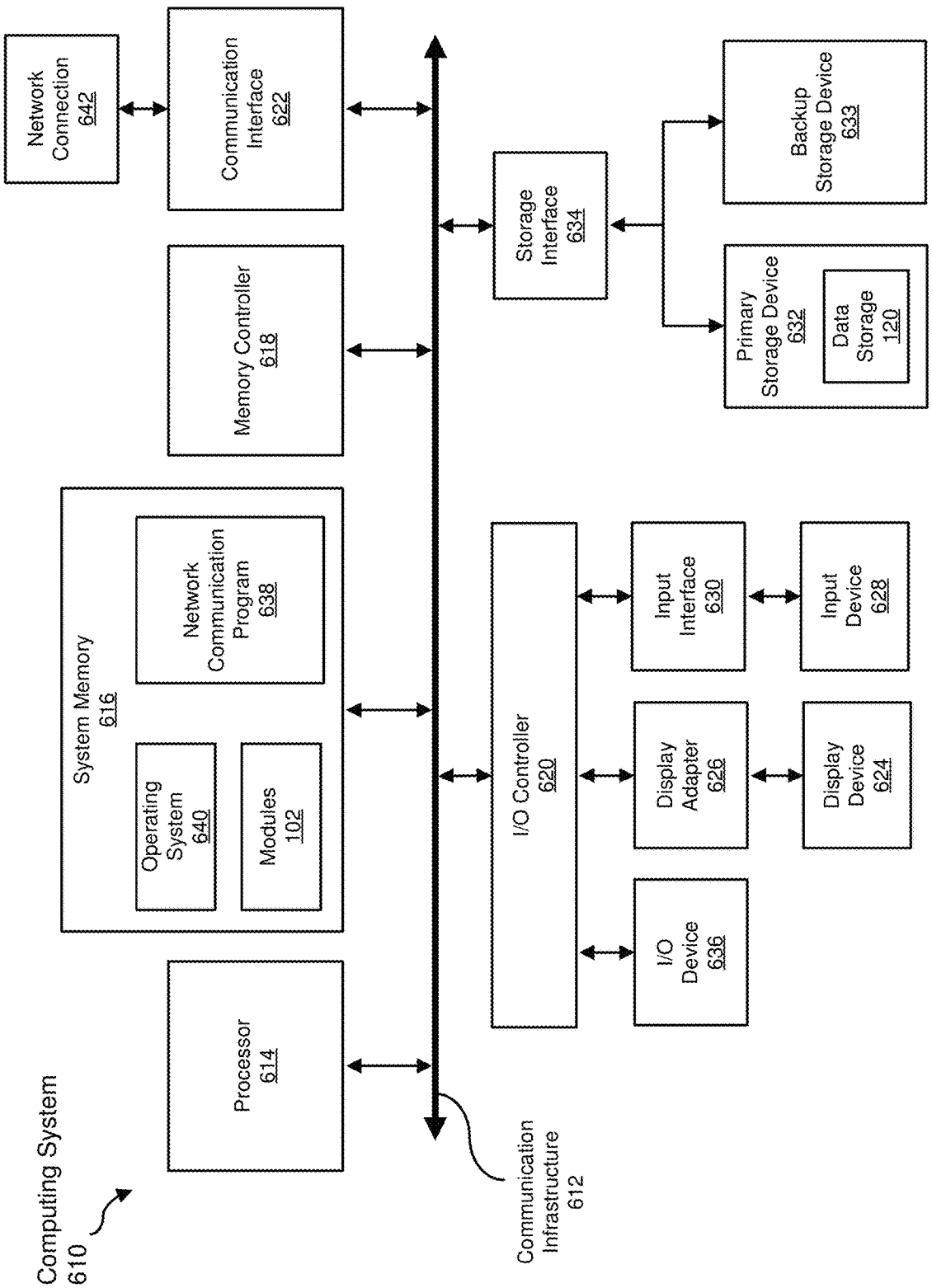
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
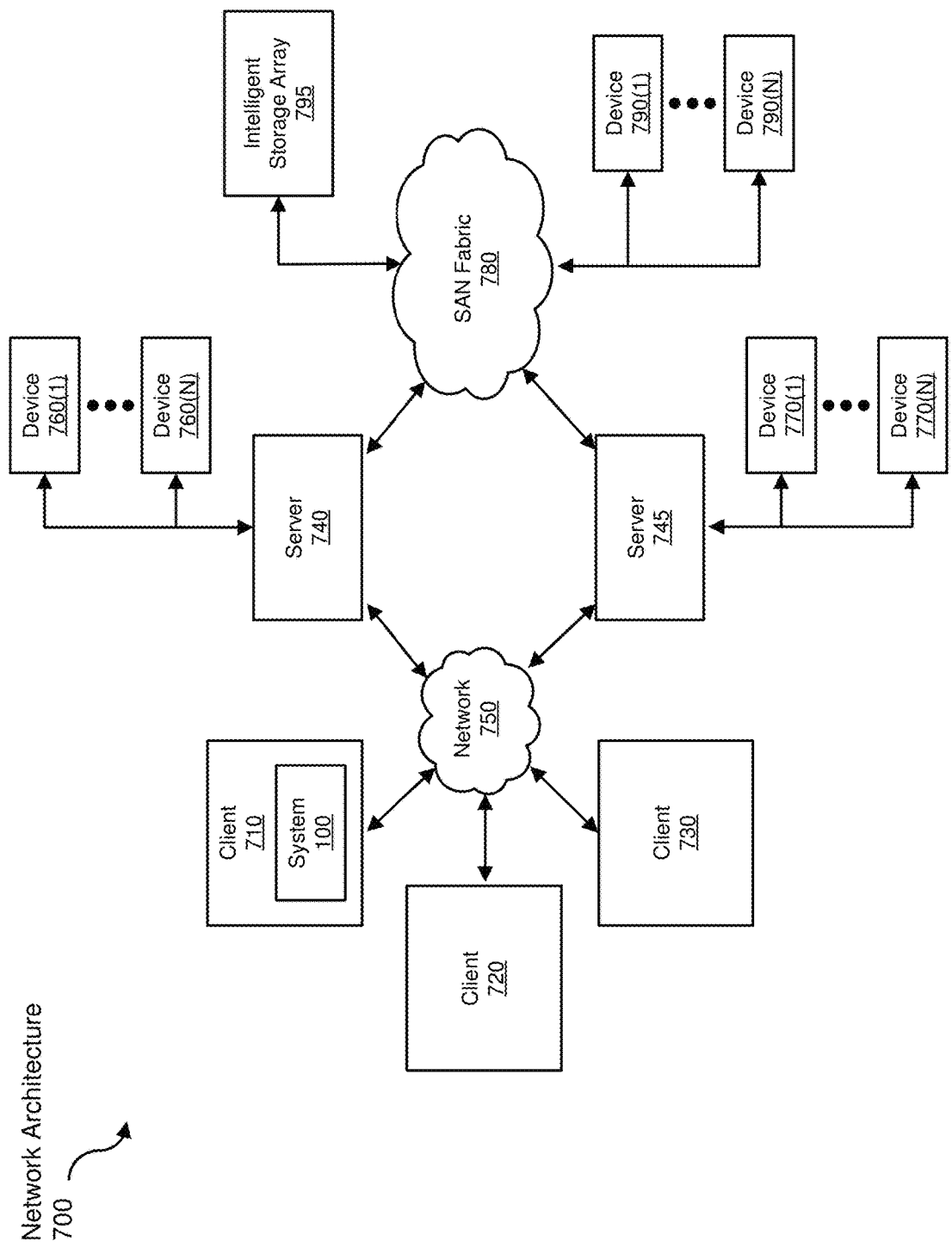
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for deep packet inspection of vulnerable network devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for deep packet inspection of vulnerable network devices, at least a portion of the method being performed by one or more computing devices comprising at least one processor, the method comprising:
    detecting, by the one or more computing devices, at least one vulnerability associated with a network device service, wherein detecting the at least one vulnerability comprises:
        initiating a scan of each of the network devices to identify at least one open device port;
        sending network device service data and version number data associated with the open device port to a vulnerability detection engine on a backend server; and
        identifying the vulnerability based on the network device service data and the version number data;
    identifying, by the one or more computing devices, one or more network devices associated with the vulnerability;
    initiating, by the one or more computing devices, a deep packet inspection of data traffic communicated by a target network device;
    determining, by the one or more computing devices and based on the deep packet inspection, one or more signatures associated with a potential malware attack for the target network device; and
    performing, by the one or more computing devices, a security action that mitigates the potential malware attack.

2. The computer-implemented method of claim 1, wherein initiating the deep packet inspection of the data traffic communicated by the target network device comprises only applying the deep packet inspection on the data traffic communicated by the target network device without impacting other data traffic communicated by any remaining network devices in a network comprising the target network device and the remaining network devices.

3. The computer-implemented method of claim 1, wherein initiating the deep packet inspection of the data traffic communicated by the target network device comprises:
    sending a notification of the vulnerability to a user of the target network device; and
    receiving a selection of an option to perform the deep packet inspection from the user.

4. The computer-implemented method of claim 1, wherein initiating the deep packet inspection of the data traffic communicated by the target network device comprises applying the deep packet inspection on the data traffic communicated by the target network device when the target network device is one of the identified network devices associated with the vulnerability.

5. The computer-implemented method of claim 1, wherein initiating the deep packet inspection of the data traffic communicated by the target network device comprises applying the deep packet inspection on the data traffic communicated by the target network device when the target network device is not one of the identified network devices associated with the vulnerability.

6. The computer-implemented method of claim 1, wherein determining, based on the deep packet inspection, one or more signatures associated with the potential malware attack for the target network device comprises:
    initiating a device scan to identify a packet signature for the data traffic communicated by the target network device;
    comparing the packet signature to a set of known malware signatures in a database; and
    determining that the one or more signatures is associated with the potential malware attack based on a match between the packet signature and at least one of the set of known malware signatures.

7. The computer-implemented method of claim 1, wherein performing the security action comprises generating a notification of the potential malware attack to a user of the target network device based on the deep packet inspection.

8. The computer-implemented method of claim 1, wherein the vulnerability comprises a remote access capability that utilizes the network device service to send potentially malicious code over an open port on the target network device.

9. The computer-implemented method of claim 1, wherein the vulnerability comprises a remote access capability that utilizes the network device service to access private user data over an open port on the target network device.

10. A system for deep packet inspection of vulnerable network devices, the system comprising:
at least one physical processor;
physical memory comprising a set of modules and computer-executable instructions that, when executed by the physical processor, cause the physical processor to:
detect, by a detection module, at least one vulnerability associated with a network device service, wherein the detection module detects the at least one vulnerability by:
initiating a scan of each of the network devices to identify at least one open device port;
sending network device service data and version number data associated with the open device port to a vulnerability detection engine on a backend server; and
identifying the vulnerability based on the network device service data and the version number data;
identify, by an identification module, one or more network devices associated with the vulnerability;
initiate, by an inspection module, a deep packet inspection of data traffic communicated by a target network device;
determine, by a determining module and based on the deep packet inspection, one or more signatures associated with a potential malware attack for the target network device; and
perform, by a security module, a security action that mitigates the potential malware attack.

11. The system of claim 10, wherein the inspection module initiates the deep packet inspection of the data traffic communicated by the target network device by only applying the deep packet inspection on the data traffic communicated by the target network device without impacting other data traffic communicated by any remaining network devices in a network comprising the target network device and the remaining network devices.

12. The system of claim 10, wherein the inspection module initiates the deep packet inspection of the data traffic communicated by the target network device by:
sending a notification of the vulnerability to a user of the target network device; and
receiving a selection of an option to perform the deep packet inspection from the user.

13. The system of claim 10, wherein the inspection module initiates the deep packet inspection of the data traffic communicated by the target network device by applying the deep packet inspection on the data traffic communicated by the target network device when the target network device is one of the identified network devices associated with the vulnerability.

14. The system of claim 10, wherein the inspection module initiates the deep packet inspection of the data traffic communicated by the target network device by applying the deep packet inspection on the data traffic communicated by the target network device when the target network device is not one of the identified network devices associated with the vulnerability.

15. The system of claim 10, wherein the determining module determines, based on the deep packet inspection, one or more signatures associated with the potential malware attack for the target network device by:
initiating a device scan to identify a packet signature for the data traffic communicated by the target network device;
comparing the packet signature to a set of known malware signatures in a database; and
determining that the one or more signatures is associated with the potential malware attack based on a match between the packet signature and at least one of the set of known malware signatures.

16. The system of claim 10, wherein the security module performs the security action by generating a notification of the potential malware attack to a user of the target network device based on the deep packet inspection.

17. The system of claim 10, wherein the vulnerability comprises a remote access capability that utilizes the network device service to send potentially malicious code over an open port on the target network device.

18. A non-transitory computer-readable medium comprising one or more computer-executable instructions that, when executed by at least one processor of a computing device, cause the computing device to:
detect at least one vulnerability associated with a network device service, wherein the at least one vulnerability is detected by:
initiating a scan of each of the network devices to identify at least one open device port;
sending network device service data and version number data associated with the open device port to a vulnerability detection engine on a backend server; and
identifying the vulnerability based on the network device service data and the version number data;
identify one or more network devices associated with the vulnerability;
initiate a deep packet inspection of data traffic communicated by a target network device;
determine, based on the deep packet inspection, one or more signatures associated with a potential malware attack for the target network device; and
perform a security action that mitigates the potential malware attack.

19. The non-transitory computer-readable medium of claim 18, wherein the computer-executable instructions cause the computing device to initiate the deep packet inspection of the data traffic communicated by the target network device by only applying the deep packet inspection on the data traffic communicated by the target network device without impacting other data traffic communicated by any remaining network devices in a network comprising the target network device and the remaining network devices.

20. The non-transitory computer-readable medium of claim 18, wherein the computer-executable instructions cause the computing device to initiate the deep packet inspection of the data traffic communicated by the target network device by:
sending a notification of the vulnerability to a user of the target network device; and
receiving a selection of an option to perform the deep packet inspection from the user.

* * * * *